US012129920B2

(12) United States Patent
Bortoli et al.

(10) Patent No.: US 12,129,920 B2
(45) Date of Patent: Oct. 29, 2024

(54) DRIVE AXLE ASSEMBLY WITH AXIALLY ADJUSTABLE LUBRICANT BAFFLE

(71) Applicant: DANA ITALIA S.R.L., Trentino (IT)

(72) Inventors: Andrea Bortoli, Arco (IT); Marco Scopesi, Arco (IT)

(73) Assignee: DANA ITALIA S.R.L., Trentino (IT)

( * ) Notice: Subject to any disclaimer, the term of this patent is extended or adjusted under 35 U.S.C. 154(b) by 0 days.

(21) Appl. No.: 18/348,961

(22) Filed: Jul. 7, 2023

(65) Prior Publication Data

US 2024/0011552 A1    Jan. 11, 2024

(30) Foreign Application Priority Data

Jul. 8, 2022    (DE) .................... 20 2022 103 860.0

(51) Int. Cl.
*F16H 57/04* (2010.01)
*F16H 48/08* (2006.01)
*F16H 57/037* (2012.01)

(52) U.S. Cl.
CPC ......... *F16H 57/0423* (2013.01); *F16H 48/08* (2013.01); *F16H 57/037* (2013.01); *F16H 2048/087* (2013.01)

(58) Field of Classification Search
CPC .. F16H 48/08; F16H 2048/087; F16H 57/037; F16H 57/0423; F16H 57/0424
See application file for complete search history.

(56) References Cited

U.S. PATENT DOCUMENTS

| 2,317,957 | A | * | 4/1943 | Frudden | B60K 17/28 74/15.2 |
| 4,274,298 | A | * | 6/1981 | Ostrander | F16C 19/548 184/6.12 |
| 2006/0211530 | A1 | * | 9/2006 | Weith | F16H 57/0483 475/160 |
| 2006/0247088 | A1 | * | 11/2006 | Valente | F16H 48/285 475/248 |
| 2008/0182702 | A1 | * | 7/2008 | Donofrio | F16H 48/24 192/222 |

FOREIGN PATENT DOCUMENTS

DE    102011003221 A1    8/2012

* cited by examiner

*Primary Examiner* — Edwin A Young
(74) *Attorney, Agent, or Firm* — McCoy Russell LLP (57) ABSTRACT

A drive axle assembly includes a drive axle housing and a differential disposed within the drive axle housing, the differential including a pinion gear configured to be driven by an input shaft, a crown gear driven by the pinion gear to rotate about a rotation axis, and a plurality of differential gears driven by the crown gear and configured to be drivingly coupled to a first and a second driven shaft. The drive axle assembly further includes a first lubricant baffle fixed to the drive axle housing and having a first axial end portion facing a toothed front face of the crown gear. And the drive axle assembly includes an exchangeable axial spacer to set an axial position of the first axial end portion of the first lubricant baffle.

15 Claims, 5 Drawing Sheets

DRIVE AXLE ASSEMBLY WITH AXIALLY ADJUSTABLE LUBRICANT BAFFLE

CROSS-REFERENCE TO RELATED APPLICATION

The present application claims priority to German Utility Model Application 20 2022 103 860.0, entitled "DRIVE AXLE ASSEMBLY WITH AXIALLY ADJUSTABLE LUBRICANT BAFFLE", and filed Jul. 8, 2022. The entire contents of the above-listed application is hereby incorporated by reference for all purposes.

TECHNICAL FIELD

The present document concerns a drive axle assembly for a vehicle, such as a road vehicle and more specifically a heavy-duty vehicle and/or an off-highway vehicle. The present document also concerns a lubricant baffle, a set having a lubricant baffle and having a spacer and it concerns a set of drive axle assemblies each having a lubricant baffle.

BACKGROUND AND SUMMARY

Lubricated drive axle assemblies are widely used in the prior art, especially in connection with differentials. While the lubricant (e.g. oil) provides significant benefits in terms of limiting mechanical contact forces and abrasion, its use is accompanied with certain challenges. For example, it is known that during operation of the drive axle assembly the lubricant provides a resistance against the rotation of gears of the drive axle assembly. This may lead to losses of mechanical energy, such as when significant lubricant splashes occur.

To reduce such losses, it is known to provide lubricant baffles that help to limit lubricant splashes and/or to guide lubricant streams in a desired manner. An example can be found in DE 10 2011 003 221 A1.

Typically, however, the lubricant baffle is shaped and dimensioned to be usable in one specific type of drive axle assembly only. This means that for every drive axle assembly, one individual type of lubricant baffle has to be constructed, produced and stored. This increases the costs of the drive axle assembly.

Thus, there is demand for a drive axle assembly having a reliable lubricant baffle at reduced costs.

This object is solved by the subject-matters of the independent claims. Advantageous embodiments are defined in the dependent claims as well as in this description and in the figures.

Accordingly, a drive axle assembly for driving first and second driven shafts of a vehicle is disclosed, the drive axle assembly comprising: a drive axle housing and a differential disposed within said drive axle housing, the differential including a pinion gear configured to be driven by an input shaft, a crown gear driven by said pinion gear to rotate about a rotation axis, and a plurality of differential gears driven by said crown gear and configured to be drivingly coupled to the first and second driven shafts; wherein the drive axle assembly further comprises a first lubricant baffle that is fixed to the drive axle housing (and e.g. axially extends towards a toothed front face of the crown gear), the first lubricant baffle having a first axial end portion facing said toothed front face; and wherein the drive axle assembly further comprises an exchangeable axial spacer to set an axial position of the first axial end portion of the first lubricant baffle.

The drive axle housing may also house any of the first lubricant baffle (or the optional second lubricant baffle discussed below) and the axial spacer. The first and second driven shaft (that may optionally be comprised by the drive axle assembly and e.g. be coupled to the differential gears) may at least partially be housed in the drive axle housing as well. This may e.g. apply to one end of each of the first and second driven shaft that reaches into the drive axle housing for being coupled with the differential.

The drive axle housing may comprise a main part, for instance made of a metallic material, such a cast iron. It may comprise an opening through which the input shaft extends. It may an opening through which the first driven shaft extends and/or another opening through which the second driven shaft extends. Any of these opening may be used for insertion and assembly of any of the components housed by the drive axle housing, for instance insertion and assembly of the crown gear and/or the of the first lubricant baffle. Additionally or alternatively, any of these openings may be comprised by a cover (e.g. a side cover discussed below). Said cover may be received in an even larger opening, such as an open side face in a main part of the drive axle housing, and may at least partially cover said larger opening.

Terms such as axial, radial and circumferential when used herein may refer to the rotation axis of the crown gear. An axial direction may extend along said rotation axis. A radial direction may extend at an angle and orthogonally to said rotation axis. A circumferential direction may extend around or about said rotation axis.

The crown gear may also be referred to and/or may be configured as a ring gear. It may have a toothed front face and a non-toothed rear face. The front face and rear face may both be axial faces. The crown gear may mesh with the pinion gear at a position that is at a radial distance to the crown gear's rotation axis. Put differently, the crown gear's teeth may be circumferentially distributed about and at a distance to said rotation axis. The crown gear and the pinion gear may define a bevel gear set. The crown gear and the pinion gear and, for instance, their rotational envelopes may define a bevel gear set ratio.

The input shaft may extend radially and/or its rotation axis may extend at an angle and orthogonally to the rotation axis of the crown gear. The pinion gear may also be referred to or may be configured as a bevel gear.

Each of the first and second driven shaft may rotate about the same rotation axis as the crown gear or about a rotation axis that extends in parallel to the crown gear's rotation axis. Each of the first and second driven shaft may be configured as or may be coupled to an axle, e.g. a half axle. Each of the first and second driven shaft may be configured to drive a vehicle wheel.

The first lubricant baffle may be fixed to an inner wall or to an inner surface of the drive axle housing. For example, at least one through hole may be provided in the drive axle housing, for instance an axially extending through hole. A mechanical fixing element, e.g. a screw bolt, may be inserted from the outside of the drive axle housing into said through hole, thereby at least partially reaching into the interior of the drive axle housing. There, the lubricant baffle may receive at least part of the inserted end of the mechanical fixing element. For doing so, the lubricant baffle may comprise at least one fixing element receiving portion, e.g. comprising a through-hole and/or a threaded section. The opposite end of the mechanical fixing element may stay outside of the drive axle housing and e.g. rest against an outer surface thereof.

This way, the lubricant baffle can be secured at the drive axle housing while only having to produce a through-hole in an otherwise unchanged drive axle housing of an existing design.

The first lubricant baffle may be fixed to the drive axle housing at or adjacent to a (second) axial end portion thereof that is opposite to first axial end portion. Said second axial end portion may face an inner surface of the drive axle housing (but may e.g. be spaced away therefrom by the axial spacer).

The first lubricant baffle may be a thin and light member, that is e.g. curved to extend in a circumferential direction. Its first axial end portion may be substantially planar and extend at an angle to the rotation axis, apart from an optional axially protruding portion discussed below. For example, the first axial end portion may extend orthogonally to the rotation axis or at an angle of more than 45°.

The first lubricant baffle may comprise of consist of a plastic material. It may be a one-piece member or, according to an embodiment discussed below, may comprise multiple members e.g. in from of several baffle parts.

The first lubricant baffle's axial dimension may exceed its radial dimension. Yet, its largest dimension may be its circumferential dimension. The position where the first lubricant baffle is fixed to the drive axle housing may be at an axial distance to the crown gear (of e.g. at least e.g. in between 1 cm and 10 cm or more than 10 cm). The first lubricant baffle may axially extend from said position towards said crown gear and specifically towards its front face.

The spacer may be a one-piece member and/or may be separately configured from the first lubricant baffle. It may be configured to receive a mechanical fixing element for fixing the first lubricant baffle to the drive axle housing. For doing so, it may comprise a through-hole, for example an axially extending through hole. In one example, an end of a mechanical fixing element that is inserted into the drive axle housing in the above described manner may also be inserted into and may extend through the axial spacer towards the first lubricant baffle.

The axial spacer may comprise (or be made of) a metallic material or a plastic material. In one example, the axial spacer is a cylindrical member. For example, it may be a pipe section or generally be an (e.g. elongated) sleeve or (e.g. elongated) bushing. It may have an axial length of more than 1 cm, e.g. in between 1 cm and 4 cm or between 2 cm and 10 cm. In one embodiment, it is shorter than 2 cm, e.g. in between 0.2 cm and 1.5 cm.

The spacer may be exchangeable for instance due to not being permanently fixed to or joined with any other components. The spacer may e.g. be clamped between the first lubricant baffle and the drive axle housing, for instance when tightening a mechanical fixing element according to any of the examples disclosed herein. Depending on a desired axial position of the first lubricant baffle, a spacer having a suitable axial dimension may be selected and combined with the e.g. standardized first lubricant baffle.

By providing the exchangeable spacer, the axial position of the first lubricant baffle can be adjusted, without said first lubricant baffle having to be re-designed. Accordingly, one and the same first lubricant baffle can be used for different drive axle assemblies and may be in combination with crown gears having different axial widths. In other words, the axial spacer enables a modularity for adjusting the first lubricant baffle to be used in different types of drive axle assemblies. For example, in case a certain minimum axial distance and/or maximum axial distance between the first axial end portion of the first lubricant baffle and the front face of the crown gear should be maintained and the axial position of said front face changes depending on the type of drive axle assembly, it is sufficient select an appropriately sized axial spacer while still using the same first lubricant baffle.

Given that the axial spacer is a comparatively cheap component, the costs can thus be reduced because one and the same first lubricant baffle can be used for a large range of different drive axle assemblies, even when their axial dimensions and/or the axial positions of their crown gears significantly vary.

According to a further embodiment, the drive axle assembly further comprises a second lubricant baffle that faces an untoothed rear face of the crown gear. The second lubricant baffle may extend substantially in parallel to (at least a radial portion) of the first axial end portion of the first lubricant baffle. The crown gear may be located axially in between the first and second lubricant baffle. For example, the first and second lubricant baffle may define a space between them in which at least part of the crown gear is accommodated and rotates.

The second lubricant baffle may be substantially planar and/or may only locally bent. It may extend at an angle to the rotation axis, orthogonally thereto. It may comprise or be made of a plastic or a metallic material. It may be fixed to a stationary component of the drive axle assembly. For example, it may be fixed to a cover (such as a side cover) that at least partially covers a (side) opening of the drive axle housing. One of the first and second driven shafts may extend through said opening and may be through an opening included in said cover. The second lubricant baffle may e.g. be fixed and may be mechanically secured to an inner face of such a cover, said inner face facing an interior of the drive axle housing (e.g. faces the differential received in said interior).

In one example, an axial distance between an axially outermost end of the first lubricant baffle and an opposite axial outermost end of the second lubricant baffle may be 0 cm or less, thereby defining a direct adjacent arrangement and/or an axial overlap between the first and second lubricant baffle. Alternatively, said axial distance may be less than 2 cm or less than 5 cm. Limiting the axial distance accordingly helps to efficiently guide the lubricant in a desired manner.

According to embodiment, the first and/or the second lubricant baffle has an axially protruding section (e.g. a lip) that is arrangeable opposite to at least a section of a circumferential face of the crown gear. The axially protruding section may thus provide and axial overlap between crown gear and the first and/or the second lubricant baffle, respectively. This axially protruding section may comprise the axial outermost end which faces and optionally overlaps with the respective other of the first and second lubricant baffle.

In one example, the first lubricant baffle (and/or the second lubricant baffle) has an extension in a circumferential direction of less than 270°, and for instance less than 180°. Put differently, the first lubricant baffle (and/or the second lubricant baffle) may extend within and/or cover an angular section of less than 270°, and for instance less than 180°. It has been found that an efficient reduction of lubricant splashes can still be achieved while limiting the circumferential extension accordingly (and thus limiting the overall size, costs and weight). Also, the respective size limitation ensures the mountability of the lubricant baffle that e.g. has to be inserted through openings into the drive axle housing.

As indicated above, the first lubricant baffle may be fixed to a side wall portion of the drive axle housing. Said side wall portion may comprise an inner side surface of the drive axle housing. Generally, the drive axle housing may have a lower wall whose inner surface may e.g. be fully covered with lubricant. Said lower wall may (e.g. in a state in which it is mounted to the vehicle) be a vertically lower wall that faces the ground on which the vehicle travels. The drive axle housing may have one or more sidewall portions which extend at an angle to the lower wall. For example, these sidewall portions may extend substantially vertically and e.g. connect the (vertically) lower wall to a (vertically) upper wall of the drive axle housing. The sidewall portion may only be immersed into and thus covered by lubricant up to a defined level.

Fixing the first lubricant baffle to a sidewall portion may limit the requirements in terms of a fluidic sealing of said fixation (e.g. compared to hypothetically fixing the lubricant baffle to a lower wall of the drive axle housing that is in permanent contact with lubricant). Also, fixing the first lubricant baffle to the sidewall portion may require only minor adjustments of existing designs of the drive axle housing, e.g. by only having to add through holes. This means that existing casting molds can still be used.

Any of the above discussed walls and sidewalls of the drive axle housing may at least partially be comprised by covers of said drive axle housing.

According to a further embodiment, the first axial end portion of the first lubricant baffle extends substantially radially and/or is free of a portion facing a circumferential face of the crown gear. For example, the first axial end portion may define or be comprised by a face of the first lubricant baffle facing the crown gear's front face. Yet, it may be provided that the first lubricant baffle does not axially overlap with the crown gear and/or the optional second lubricant baffle. For doing so, it may not have a (e.g. axially protruding) portion that axially overlaps with the circumferential outer face of the crown gear. It has been of observed that this may still be sufficient to reliably reduce lubricant splashes, while at the same time reducing the size and weight of the first lubricant baffle.

It may be provided that the first axial end portion extends along a complete radial dimension of a toothed segment of the crown gear. Put differently, at least a segment of the front face of the crown gear may be covered along its complete radial dimension by the first lubricant baffle. This helps to significantly reduce lubricant splashes.

According to further embodiment, the first lubricant baffle comprises at least two baffle parts. Each baffle part may comprise a part of the first axial end portion. For example, the baffle parts may be arranged next to one another in a circumferential direction and/or comprise circumferentially adjacent sections of the first axial end portion of the first lubricant baffle. The baffle parts may be similarly sized, at least with respect to their respectively comprised segments of the first end portion. In one example, the baffle parts are identical to reduce production costs.

Providing a plurality of baffle parts may help to ensure that these baffle parts are insertable through existing and/or narrow openings into the drive axle housing. Yet, once inserted, the baffle parts may be combined to provide a first lubricant baffle having a size that would not allow for a respective insertion to the drive axle housing in one piece.

Each baffle part may have a first circumferential end portion and a second circumferential end portion. The baffle parts may be identical to one another at least with respect to said first circumferential end portion and second circumferential end portion. The first and second circumferential end portions may define stepped portions and/or (e.g. axially) protruding or (e.g. axially) recessed portions, said protrusion or recess e.g. amounting to not more than 5 cm or not more than 1 cm compared to an adjacent section of the baffle part. In other words, the first and/or second circumferential end portion may define out-of-plane portions, e.g. compared to a circumferentially adjacent portion of the baffle part. In one example, the first circumferential end portion and the second circumferential end portion of each of the parts may be different from one another, such as with one of said portions being a recessed portion and the other a protruding portion discussed above.

Providing such at least partially identical baffle parts simplifies production and assembly, e.g. because any two baffle parts can be combined to produce the overall first lubricant baffle.

The baffle parts may overlap one another and may circumferentially overlap one another. For doing so, a first circumferential end portion of one of the baffle parts may overlap with a second circumferential end portion of the respective other baffle part. In this manner, more than two baffle parts can (at least hypothetically) be arranged circumferentially adjacent to one another whereas each first circumferential end portion of one baffle part faces and overlaps with a second circumferential end portion of an adjacent baffle part.

Accordingly, it may be provided that the first and second circumferential end portions of the each baffle part are shaped differently from one another and that the first circumferential end portion of each baffle part is configured to be arrangeable in an overlapping manner with a second circumferential end portion of the respective other baffle part.

The first lubricant baffle may comprise a plastic material. For example, each baffle part may be a plastic part and for example a one-piece plastic part. In this context it is especially advantageous when the baffle parts are identical (as generally suggested according to one embodiment of the presently proposed subject matter). Using identical plastic baffle parts means that one of the same casting mold can be used for producing all baffle parts, such as one of the same injection casting mold.

According to a further development, the first lubricant baffle comprises at least one protrusion protruding radially outwards and configured to contact the drive axle housing when the first lubricant baffle radially deflects. For example, said protrusion may be provided at a radially outer face of the first baffle part that faces an interior surface of the drive axle housing (such asof a lower wall thereof).

The deflection may occur during assembly. For example, the crown gear may rest against the initially mounted first lubricant baffle e.g. after having been inserted into the drive axle housing and prior to being fixed to the differential cage. The first lubricant baffle may be configured to support the crown gear in this stage with its radial protrusion which acts as a stop member and provides a defined contact for resting against the drive axle housing. Once the assembly is completed, the first lubricant baffle may no longer contact the crown gear and no longer radially deflect and the protrusion may no longer contact the drive axle housing.

The presently proposed subject matter also concerns a lubricant baffle for a drive axle assembly according to any of the aspects disclosed herein. This may include a lubricant baffle comprising two baffle parts according to any examples disclosed herein (and e.g. no spacer).

The presently proposed subject matter also concerns a set comprising a lubricant baffle according to any of the aspects disclosed herein and at least one spacer for a drive axle assembly according to any of the aspects disclosed herein.

The presently proposed subject matter also concerns a set of drive axle assemblies, the set comprising a first drive axle assembly according to any of the aspects disclosed herein and a second drive axle assembly according to any of the aspects disclosed herein. The first and second drive axle assembly comprise identical first lubricant baffles. Yet, in the first drive axle assembly the spacer has a first axial length and in the second drive axle assembly the spacer has a second axial length that is different from the first axial length. This underlines a main advantage of the present presently proposed subject matter according to which flexibility and modularity is provided by the comparatively cheap and small exchangeable axial spacer. Of course, the above set of drive axle assemblies may comprise more than two drive axle assemblies, wherein each drive axle assembly may have a differently sized axial spacer.

In this connection, the above first drive axle assembly and the second drive axle assembly may have different bevel set gear ratios as defined by the pinion gear and crown gear of each drive axle assembly. For instance, the axial position and/or axial dimension (for instance the axial width) of the crown gear may be different between the first and second drive axle assembly, which may be a result of the difference in bevel set gear ratios. The axial lengths of the spacers of the first and second drive axle assemblies may be adjusted in accordance with said difference in bevel set gear ratios.

In the following, embodiments of the presently proposed subject matter are discussed with reference to the attached schematic figures. Throughout the figures, identical or similar features may be marked with same reference signs.

DETAILED DESCRIPTION

Figure 1:
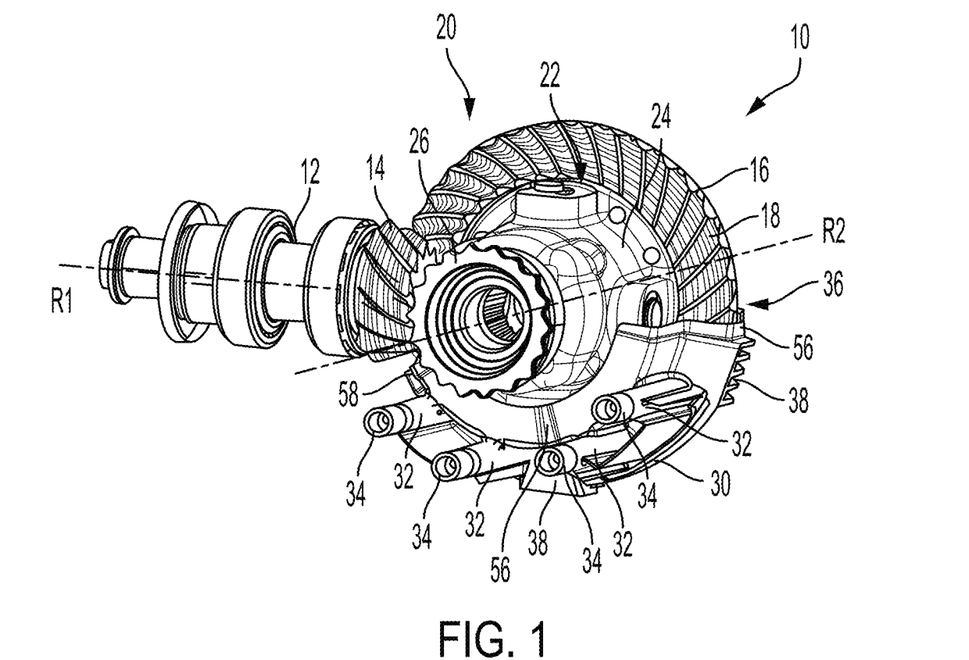
FIG. 1 is a perspective view of part of a drive axle assembly according to a first embodiment.

FIG. 1 shows part of a drive axle assembly 10 according to a first embodiment. A drive axle housing 40 of the drive axle assembly 10 is not depicted but is shown e.g. in FIG. 3.

The drive axle assembly 10 comprises an input shaft 12 that rotates about a rotation axis R1. The input shaft 12 is coupled with a pinion gear 14 and is driven to rotate said that the pinion gear 14 about the rotation axis R1. The pinion gear 14 meshes with a crown gear 16. The pinion gear 14 and crown gear 16 define a bevel gear set.

In FIG. 1, a toothed front face 18 of the crown gear 16 faces the viewer. The crown gear 16 is configured to rotate about a rotation axis R2. This rotation axis R2 act as a reference for any axial, radial and circumferential direction referred to in this description. The rotation axis R2 of the crown gear 16 extends at an angle and may be positioned orthogonally to the rotation axis R1 of the input shaft 12.

The pinion gear 14 and crown gear 16 are part of a differential 20. The differential 20 further comprises differential gears 22 that are obstructed in FIG. 1 by a differential cage 24. The differential gears 22 are visible in FIGS. 3-6.

The differential 20 and more specifically its differential gears 22 are drivingly coupled to a first connecting portion 26 that is configured to be coupled to a non-illustrated first driven shaft. The differential gears 22 are also drivingly coupled to a second connecting portion 28 (see FIG. 2) that is configured to be coupled to a non-illustrated second driven shaft. Each of the first and second driven shaft are half axles that are drivingly coupled to non-illustrated vehicle wheels.

Figure 2:
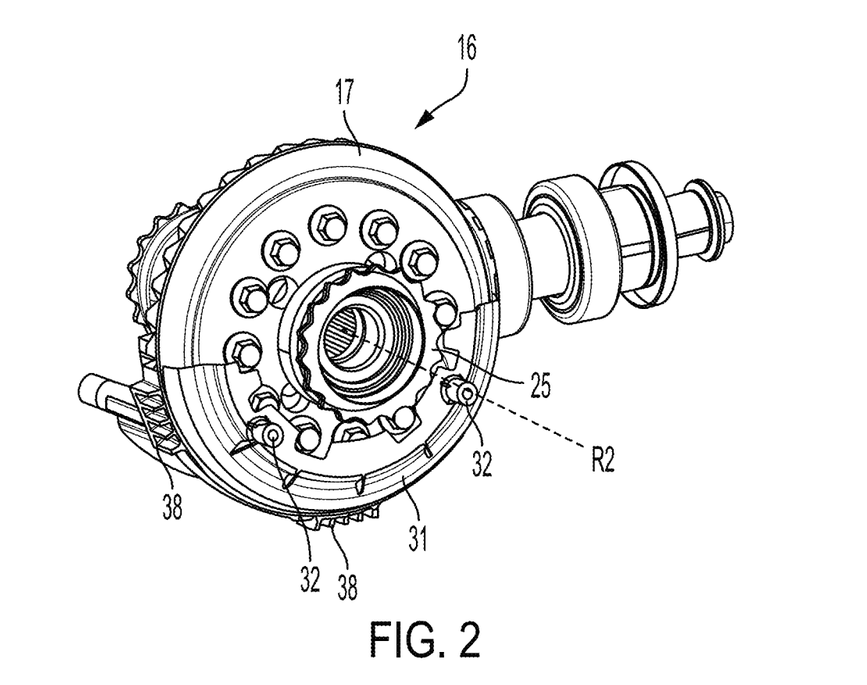
FIG. 2 is another perspective view of part of the drive axle assembly according to the first embodiment.

The drive axle assembly 10 further comprises a first lubricant baffle 30 facing the viewer in FIG. 1 a second lubricant baffle 31 facing the viewer in FIG. 2. The first lubricant baffle 30 has a number of axially protruding fixing element receiving portions 32. At a free axial end of each fixing element receiving portion 32 facing the viewer in FIG. 1, an axial spacer 34 is provided. The axial spacers 34 define an axially outermost end of a set comprising said axial spacers 34 and the first lubricant baffle 30.

The first lubricant baffle 34 also comprises a first axial end portion 36 at an opposite axial side compared to the first axial spacers 34. The first axial end portion 36 faces and covers the front face 18 of the crown gear 16. This is further discussed with reference to the sectional view of FIGS. 3 to 6 below.

The first lubricant baffle 30 further has a plurality of radially protruding portions 38 that are distributed along a circumference of the first lubricant baffle 32. In one embodiment, at least one of said radially protruding portions 38 forms a radially outermost and may be vertically lowermost portion of the first lubricant baffle 30.

FIG. 1 shows that a circumferential extension of the first lubricant baffle 30 or, in other words, an angular section covered by the first lubricant baffle 30 and for instance by its first axial end portion 36 is between more than 900 and less than 180°, e.g. between 1000 and 160°. Yet, according to another embodiment, said angular section may be more than 180°, e.g. up to 220°, up to 270° or more than 300°.

FIG. 2 is a view of the drive axle assembly 10 according to the first embodiment, but with a rear face 17 of the crown gear 16 facing the viewer. At said rear face 17, no teeth are provided. It can be seen that the second lubricant baffle 31 equally extends along the crown gear 16 and covers an angular sector thereof of e.g. in between 100° and 180°. Also, fixing element receiving portions 32 are provided at a rear side of the second lubricant baffle 31 that faces away from the crown gear 16. According to another embodiment, the angular section covered by the second lubricant baffle 31 may be more than 180°, e.g. up to 220°, up to 270° or more than 300°.

As further evident from the below discussion of the sectional views in FIGS. 3 to 6, the first and second lubricant baffle 30, 31 receive and house a part of the crown gear 16 in between them to limit lubricant splashes and thus losses of mechanical energy.

All figures illustrate an orientation of the drive axle assembly 10 when mounted to a vehicle. Accordingly, it is evident that the first and second lubricant baffle 30, 31 enclose a vertically lower part, e.g. almost a lower half, of the crown gear 16 in between them.

Figure 3:
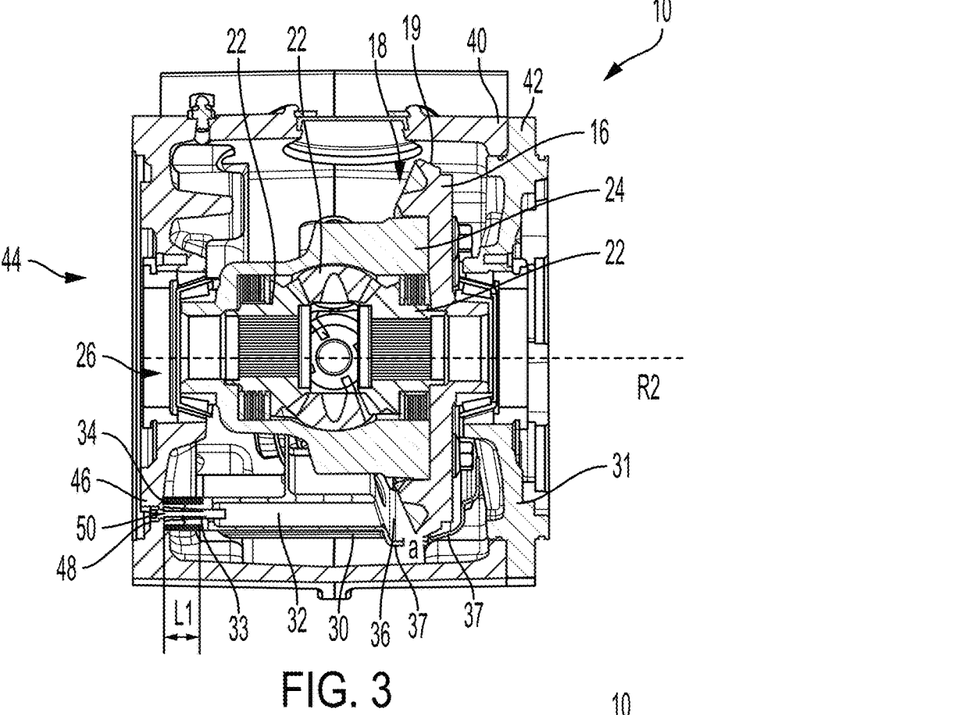
FIG. 3 is a sectional view of the drive axle assembly according to the first embodiment.

FIG. 3 is a sectional view of the drive axle assembly 10 according to the first embodiment and with the sectional plane comprising the rotation axis R2 of the crown gear 16. On the other hand, the sectional plane does not comprise the input shaft 12, so that said input shaft 12 and pinion gear 14 are not visible in FIG. 3.

Figure 4:
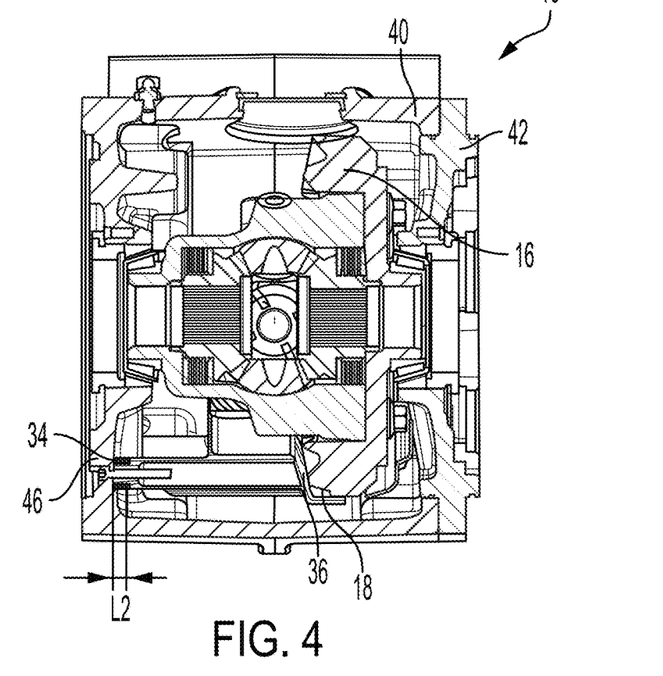
FIG. 4 is a sectional view of a drive axle assembly according to a second embodiment.
Figure 5:
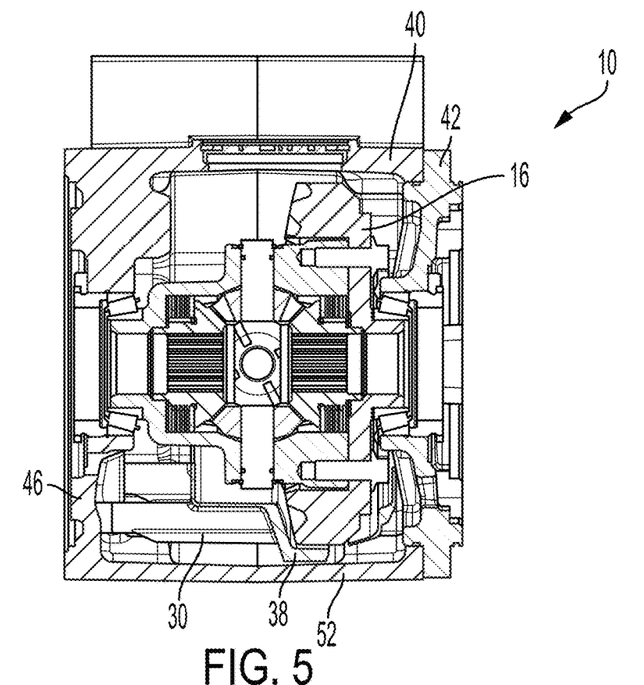
FIG. 5 is another sectional view of the drive axle assembly according to the second embodiment.
Figure 6:
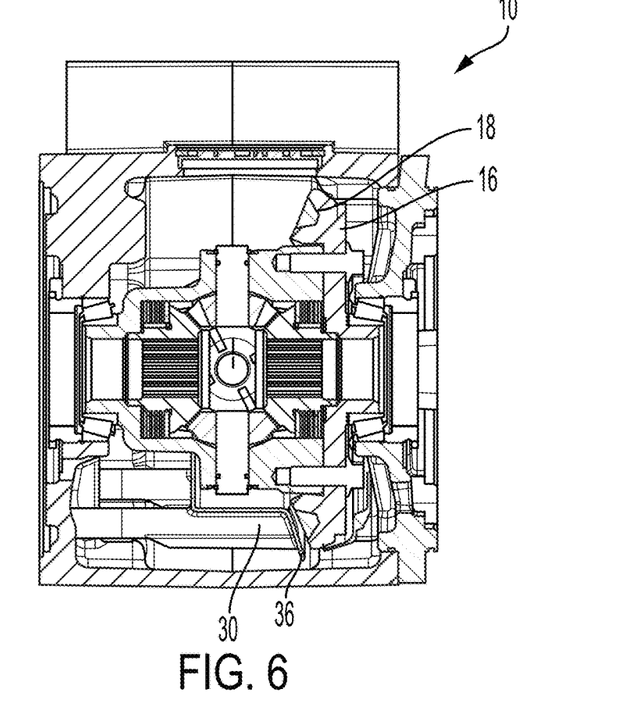
FIG. 6 is a sectional view of a drive axle assembly according to a third embodiment.

In FIG. 3, the differential gears 22 of the differential 20 are marked. In FIGS. 4-6, such differential gears 22 are equally present but are not marked with specific reference signs. Further, in FIG. 3 a drive axle housing 40 of the drive axle assembly 10 is shown. Said drive axle housing 40 has an open side face near the crown gear 16 which is partially covered by a side cover 42. At its axially opposite side, the drive axle housing 40 has a substantially smaller opening 44 through which the coupling portion 26 is accessible (e.g. into which a non-illustrated first driven shaft can be inserted).

The open side face that is covered by the side cover 42 is used to insert the members housed by the drive axle housing 14 and for instance the crown gear 16 and the first lubricant baffle 30.

FIG. 3 includes a sectional view of one of the fixing element receiving portions 32 of the first lubricant baffle 30. Said fixing element receiving portion 32 is an elongated hollow cylindrical member. At a free axial end of said fixing element receiving portion 32 facing a left side wall 46 of the drive axle housing 40, a spacer 34 is provided. At one axial end, the spacer 34 contacts the fixing element receiving portion 32 and at the other axial end, it contacts an inner surface of the side wall 46. This way, the spacer 34 sets an axial distance between the fixing element receiving portion 32 and the side wall 46. This also means that an axial position of the first axial end portion 36 of the first lubricant baffle 30 is determined by the spacer 34 (and specifically by its axial length).

In the shown example, the spacer 34 is a hollow tube-like member optionally having a circular cross-section. For example, the spacer 34 may be a pipe-section.

FIG. 3 also shows that a through-hole 48 is provided in the side wall 46 through which a screw bolt 50 forming a mechanical fixing element is inserted. The screw bolt 50 reaches into the drive axle housing 40 and is screwed into a threaded section 33 of the fixing element receiving section 32. At the same time, the screw bolt 50 extends through the axial spacer 34 without, however, contacting it or being mechanically connected thereto.

When tightening the screw bolt 50, the first lubricant baffle 30 is pulled towards the side wall 46, thereby clamping the axial spacer 34 between the drive axle housing 40 and the first lubricant baffle 30. This means that when loosening and removing the screw bolt 50, the axial spacer 34 can be easily exchanged for an axial spacer 34 having a different axial length. It is noted that the above observations apply to all fixing element receiving portions 32 and spacers 34 as depicted in FIG. 1, and which are not included in the sectional plane of FIG. 3.

The threaded section 33 is provided at a second axial end portion of the first lubricant baffle 30. The opposite first axial end portion 36 faces the front face 18 of the crown gear 16 and may extend along a at least half of or along the complete radial height thereof, for example.

As a further optional feature, the first axial end portion 36 also comprises an axially protruding portion 37a that faces at least part of an outer circumferential face 19 of the crown gear 16. This may provide a effective shielding. In the shown example, the second lubricant baffle 31 also has an axially protruding portion 37b that faces part of the circumferential surface 19 of the crown gear 16. In FIG. 3, free axial end faces of the first lubricant baffle 30 and second lubricant baffle 31 are directly adjacent to one another, but can optionally be at an axial distance to one another (see FIG. 4) or may axially overlap one another.

In FIG. 3, the crown gear 16 has a comparatively small axial width. In order to ensure a sufficient proximity of the first axial end portion 36 of the first lubricant baffle 30 to the front face 18 of the crown gear 16, the axial spacer 34 has a comparatively large axial length L1 (e.g. between 1 cm and 4 cm (e.g. between 1.3 cm and 3.5 cm) or between 4 cm and 10 cm).

In FIG. 4, another embodiment is shown. This is substantially identical to the embodiment of FIG. 3 apart from the crown gear 16 having a much larger axial width. In order to ensure a sufficient axial distance (such as to avoid a physical contact) between the first axial end portion 36 and the front face 18 of the crown gear 16, the axial position of the first axial end portion 36 should be closer to the side wall 46 compared to FIG. 3. This is achieved by selecting a different axial spacer 34 compared to FIG. 3, said axial spacer 34 having a reduced axial length L2. Yet, the same first lubricant baffle 30 can be used as in case of FIG. 3.

Accordingly, the drive axle assembly 10 according to FIG. 3 and the drive axle assembly 10 according to FIG. 4 represent a set of drive axle assemblies 10 according to an embodiment of the presently proposed subject matter. The drive axle assemblies 10 of said set differ from one another with respect to or only with respect to their bevel set gear ratio and the axial lengths L1, L2 of their axial spacers 34.

This shows that according to the present presently proposed subject matter, one of the same first lubricant baffle 30 can be used for a number of different drive axle assemblies 10 and may be in connection with a number of different bevel gear set ratios by only exchanging the comparatively small and cheap axial spacer 34.

In FIG. 5, the sectional plane extends substantially vertically. Referring to FIG. 1, it thus extends through the lowermost radially protruding portion 38 of the first lubricant baffle 30. FIG. 5 thus confirms that said radially protruding portion 38 is in close proximity to a lower wall 52 of the drive axle housing 14.

During assembly, the crown gear 16 (which could also be dimensioned similar to FIG. 3) is inserted into the drive axle housing 14 after the first lubricant baffle 30 and for instance after the first lubricant baffle 30 is fixed to the side wall 46. Prior to the crown gear 16 being connected to the differential cage 24, it rests against the inner face of the radially protruding portion 38 under its own weight. As a result, the radially protruding portion 38 elastically deflects until it contacts an inner face of the lower wall 52. Therefore, the radially protruding portion 38 acts as a stop element for temporarily securing a radial position of the crown gear 16 during assembly. In this context, it is advantageous to configure the first lubricant baffle 30 as a plastic part, thereby limiting damages to the crown gear 16.

From FIG. 5, it is evident that during operation, the first lubricant baffle 30 stays at a radial distance to the lower wall 52 of the drive axle housing 14 and, for instance, is not fixed thereto.

FIG. 6 illustrates another embodiment that is generally comparable to that of e.g. FIG. 3. A difference to the embodiment of FIG. 3 exists in that the first axial end portion 36 of the first lubricant buffer 30 is free of an axially protruding portion 37a (which may also be referred to as a lip). Therefore, the first axial end portion 36 extends substantially radially along the front face 18 of the crown gear 16.

In any of the above embodiments, the first lubricant baffle 30 is a multi-part member comprising two identically configured baffle parts 54. This becomes more evident from FIG. 7 which is a another view of part of the drive axle assembly 10 according to the first embodiment. The viewing angle corresponds to a view on the open side face of the drive axle housing 40 that is covered by the (non-illustrated) side cover 42 of FIG. 3.

The baffle parts 54 are arranged in a circumferential sequence, e.g. next to one another when viewed in a circumferential direction. They each comprise half of the first axial end portion 36. Also, they each comprise an identically configured first circumferential end portion 56 which is visible only at the right baffle part 54 in FIG. 7. Also, they each comprise an identically configured second circumferential end portion 58 which may be visible at the left baffle part 54 FIG. 7. In the region of contact between the first and second baffle part 54, the (non-visible) first circumferential end portion 56 of the left baffle part 54 of FIG. 7 contacts and circumferentially overlaps with the second circumferential end portion 58 of the right baffle part 54 of FIG. 7 (see also FIG. 1).

Figure 7:
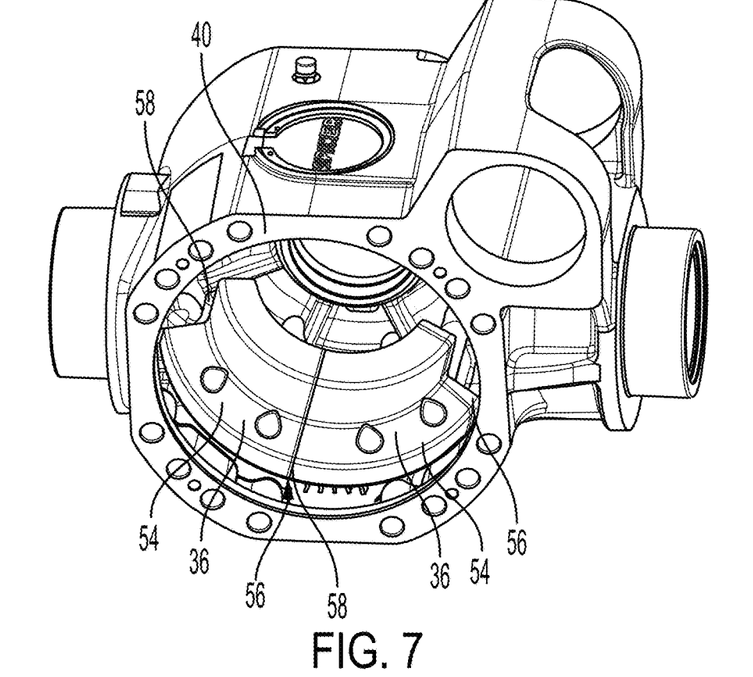
FIG. 7 is another perspective view of part of the drive axle assembly according to the first embodiment.

In the shown example, the first circumferential end portion 56 is an (for instance axially) slightly recessed portion. The second circumferential end portion 58 is designed to be positioned on top of said recessed portion. This may optionally include the second circumferential end portion 58 being an (axially) slightly protruding portion. As an alternative to creating an overlap between the first and second circumferential end portions 56, 58, a different structural engagement may be provided.

Given that the baffle parts 54 are identically configured, the overall number of different parts is reduced and errors during assembly become less likely. Moreover, the first lubricant baffle part 54 can be provided with a dimension (such as in a circumferential direction) that would render it impossible to directly insert it through the open side face of the drive axle housing 40 in one-piece.

Figure 8:
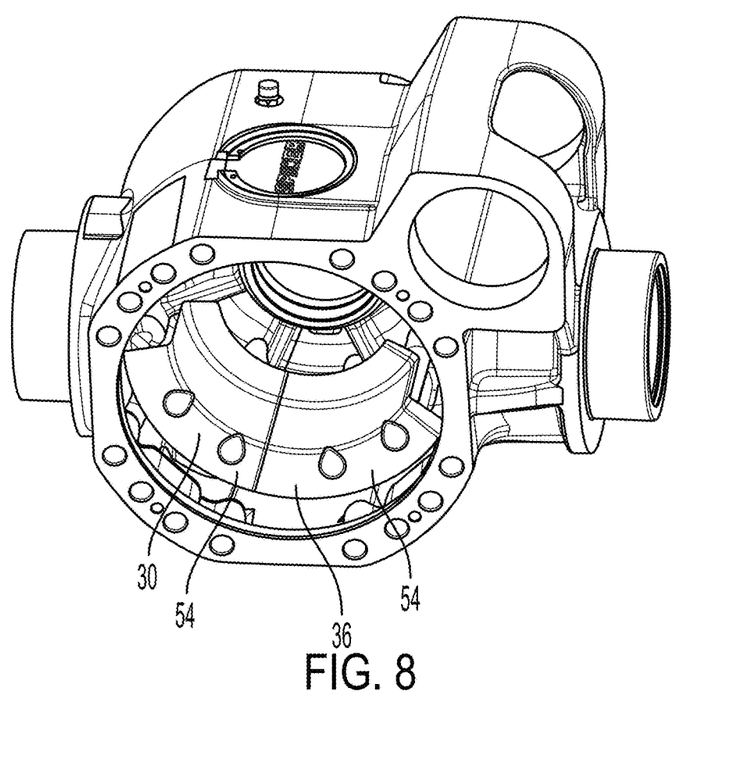
FIG. 8 is another perspective view of part of the drive axle assembly according to the third embodiment.

FIG. 8 is a view similar to FIG. 7, but showing the first lubricant baffle 30 without an axially protruding portion at the first axial end portion 36, similar to the embodiment of FIG. 6.

Figure 9:
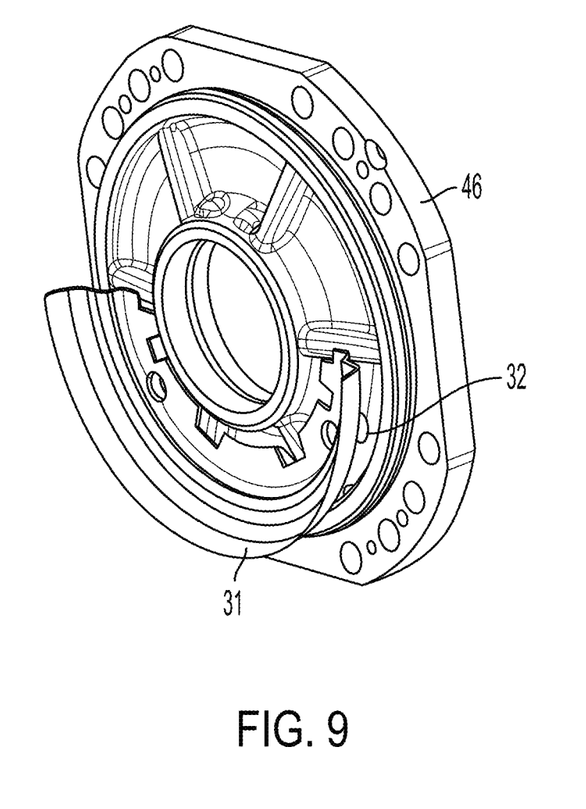
FIG. 9 shows a side cover and a second lubricant baffle fixed thereto according to the first embodiment.

FIG. 9 is a view of the side cover 42 of the drive axle assembly 10 according to the first embodiment (see FIG. 3). A face of the side cover 42 facing the (non-illustrated) crown gear 16 faces the viewer in FIG. 9. FIG. 9 illustrates that the optional second lubricant baffle 31 is mechanically fixed to said side cover 42. In this case, only one of the fixing element receiving portions 32 of FIG. 2 is partially visible and also acts as a spacer between the side cover 42 and the second lubricant buffer 31. Non-visible screw bolts are inserted through non-visible through-holes in the side cover 42 to reach into the fixing element receiving portions 32 an engage with threaded sections thereof.

FIGS. 1-9, drawn to scale (although other dimensions may be used) show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:

1. A drive axle assembly for driving first and second driven shafts of a vehicle, the drive axle assembly comprising:
   a drive axle housing and a differential disposed within said drive axle housing, the differential including a pinion gear configured to be driven by an input shaft, a crown gear driven by said pinion gear to rotate about a rotation axis, and a plurality of differential gears driven by said crown gear and configured to be drivingly coupled to the first and second driven shafts;
   wherein the drive axle assembly further comprises a first lubricant baffle that is fixed to the drive axle housing, the first lubricant baffle having a first axial end portion facing a toothed front face of the crown gear; and
   wherein the drive axle assembly further comprises an exchangeable axial spacer to set an axial position of the first axial end portion of the first lubricant baffle.

2. The drive axle assembly of claim 1, further comprising a second lubricant baffle that faces an untoothed rear face of the crown gear.

3. The drive axle assembly of claim 1, wherein the first lubricant baffle has an extension in a circumferential direction of less than 270° or of less than 180°.

4. The drive axle assembly of claim 1, wherein the first lubricant baffle is fixed to a side wall portion of the drive axle housing.

5. The drive axle assembly of claim 1, wherein the first axial end portion extends substantially radially and/or is free of a portion facing a circumferential face of the crown gear.

6. The drive axle assembly of claim 1, wherein the first axial end portion extends along a complete radial dimension of a toothed segment of the crown gear.

7. The drive axle assembly of claim 1, wherein the first lubricant baffle comprises at least two baffle parts, wherein each baffle part comprises a part of the first axial end portion.

8. The drive axle assembly of claim 7, wherein each baffle part has a first circumferential end portion and a second circumferential end portion, the baffle parts being identical to one another at least with respect to said first circumferential end portion and second circumferential end portion.

9. The drive axle assembly of claim 8, wherein the first and second circumferential end portions are shaped differently and the first circumferential end portion of each baffle part is configured to be arrangeable in an overlapping manner with the second circumferential end portion of a respective other baffle part.

10. The drive axle assembly of claim 7, wherein the baffle parts overlap one another.

11. The drive axle assembly of claim 7, wherein each baffle part is a one-piece plastic part.

12. The drive axle assembly of claim 1, wherein the first lubricant baffle comprises a plastic material.

13. The drive axle assembly of claim 1, wherein the first lubricant baffle comprises at least one protrusion protruding radially outwards and configured to contact the drive axle housing when the first lubricant baffle radially deflects.

14. A set of drive axle assemblies, the set comprising:
a first drive axle assembly for driving first and second driven shafts of a vehicle, the first drive axle assembly including a drive axle housing and a differential disposed within said drive axle housing, the differential including a pinion gear configured to be driven by an input shaft, a crown gear driven by said pinion gear to rotate about a rotation axis, and a plurality of differential gears driven by said crown gear and configured to be drivingly coupled to the first and second driven shafts, wherein the first drive axle assembly further comprises a first lubricant baffle that is fixed to the drive axle housing, the first lubricant baffle having a first axial end portion facing a toothed front face of the crown gear, and wherein the first drive axle assembly further comprises an exchangeable axial spacer to set an axial position of the first axial end portion of the first lubricant baffle; and
a second drive axle assembly for driving another first and second driven shafts of the vehicle, the second drive axle assembly including another drive axle housing and another differential disposed within said another drive axle housing, the another differential including another pinion gear configured to be driven by another input shaft, another crown gear driven by said another pinion gear to rotate about another rotation axis, and another plurality of differential gears driven by said another crown gear and configured to be drivingly coupled to the another first and second driven shafts, wherein the second drive axle assembly further comprises another first lubricant baffle that is fixed to the another drive axle housing, the another first lubricant baffle having another first axial end portion facing another toothed front face of the another crown gear, and wherein the second drive axle assembly further comprises another exchangeable axial spacer to set another axial position of the another first axial end portion of the another first lubricant baffle,
the first and the second drive axle assemblies each comprising identical first lubricant baffles, wherein in the first drive axle assembly the spacer has a first axial length and in the second drive axle assembly the another spacer has a second axial length that is different from the first axial length.

15. The set of claim 14, wherein the first drive axle assembly and the second drive axle assembly have different bevel set gear ratios as defined by the pinion gear and crown gear of said first and second drive axle assembly.

* * * * *